United States Patent [19]

Urano et al.

[11] 4,222,651
[45] Sep. 16, 1980

[54] CAMERA FILM REWINDING DEVICE

[75] Inventors: Fumio Urano, Omiya; Takumi Kobayashi, Tokyo, both of Japan

[73] Assignee: Asahi Kogaku Kogyo Kabushiki Kaisha, Tokyo, Japan

[21] Appl. No.: 951,817

[22] Filed: Oct. 16, 1978

[30] Foreign Application Priority Data

Oct. 17, 1977 [JP] Japan .................... 52-139084[U]

[51] Int. Cl.³ .................. G03B 19/04; G03B 17/38
[52] U.S. Cl. ................................. 354/214; 354/266
[58] Field of Search .................... 354/214, 266, 288

[56] References Cited

U.S. PATENT DOCUMENTS 3,485,156  12/1969  Takahashi et al. ............... 354/214
3,946,408  3/1976   Taguchi ......................... 354/266 X

FOREIGN PATENT DOCUMENTS 1203124  10/1965  Fed. Rep. of Germany ........... 354/214

Primary Examiner—Donald A. Griffin

Attorney, Agent, or Firm—Sughrue, Rothwell, Mion, Zinn and Macpeak

[57] ABSTRACT

A film rewinding device in a camera in which depression of a sprocket shaft causes a clutch mechanism between a winding mechanism and a sprocket to be disengaged. This action causes a locking member to lock the sprocket shaft, to maintain the sprocket in rewinding state. The film rewinding device comprises a winding button linked to the sprocket shaft and appearing in a recess formed in an outer housing member of said camera. A bearing member is provided for the rewinding button and has a groove in the upper surface thereof. Hence, depression of said rewinding button to the depth of the groove in said bearing member will cause the sprocket shaft to be depressed to the disengagement position of the clutch mechanism provided between the winding mechanism and the sprocket. This maintains the clutch mechanism in a disengagement state by means of the locking member thereby to permit the film to be rewound.

5 Claims, 6 Drawing Figures

CAMERA FILM REWINDING DEVICE

BACKGROUND OF THE INVENTION

This invention relates to a film rewinding device in a camera.

Heretofore, in many film rewinding cases, the sprocket shaft in a camera is depressed to disengage a clutch mechansim provided between the winding mechanism and the sprocket and also to maintain the thus disengaged winding mechanism locked. In many cases, the operating member of the film rewinding device of this type is such that one end portion of the sprocket shaft or the operating button linked to the sprocket shaft protrudes into a recess formed in the bottom of the housing member of the camera body. Therefore, during a photographing operation or handling of the camera in general, the operating button may be unintentionally depressed. Furthermore, with the conventional film rewinding device, it is necessary to provide an air gap between the housing member and the operating member because of machining accuracy. Thus, the conventional film rewinding device is not generally dust-proof, which will adversely effect the internal mechanism in the camera.

SUMMARY OF THE INVENTION

Accordingly, an object of this invention is to eliminate the above-described drawback accompanying a conventional film rewinding device.

It is another object of this invention to provide a rewind device that is simply constructed yet cannot be accidently depressed.

These and other objects of this invention are accomplished by means of a camera film winding device having a winding button linked to the film sprocket shaft and located in a recess on the camera body housing. A bearing member is provided for the rewind button and has a groove located in its upper surface. The depression of the rewind button to the depth of the groove will cause the corresponding depression of the sprocket shaft into a disengagement position of the clutch mechanism. A locking member will then lock the sprocket shaft to maintain the clutch disengaged. Hence, a rewinding operation may take place.

This invention will be described with reference to the following drawings.

DESCRIPTION OF THE PREFERRED EMBODIMENT

Figure 1:
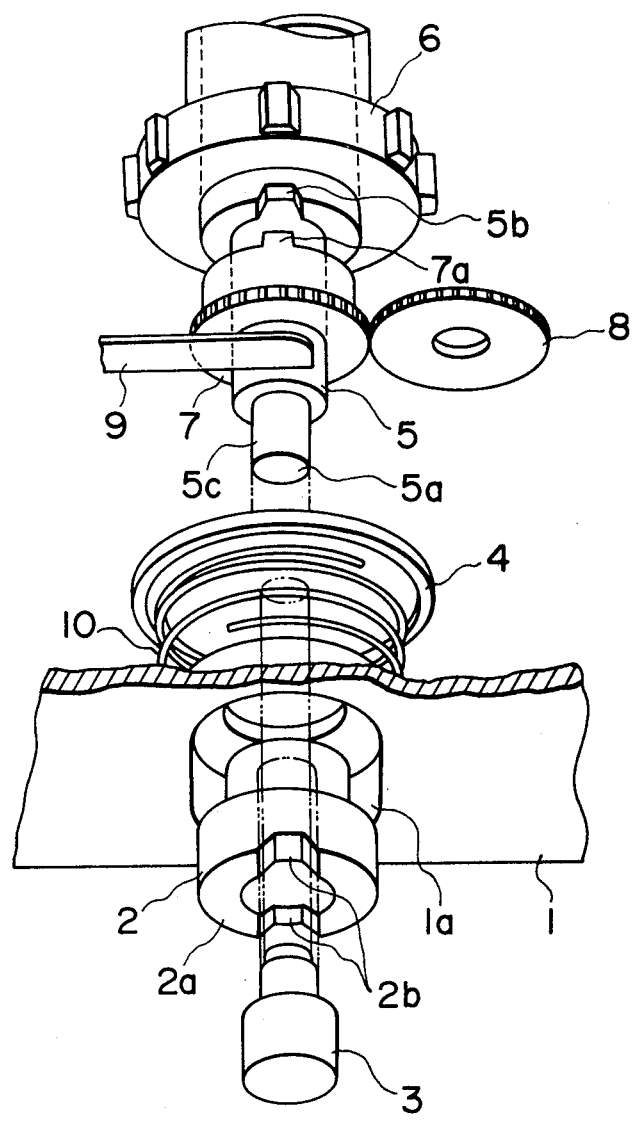
FIG. 1 is a perspective view showing a film rewinding device embodying this invention.
Figure 2:
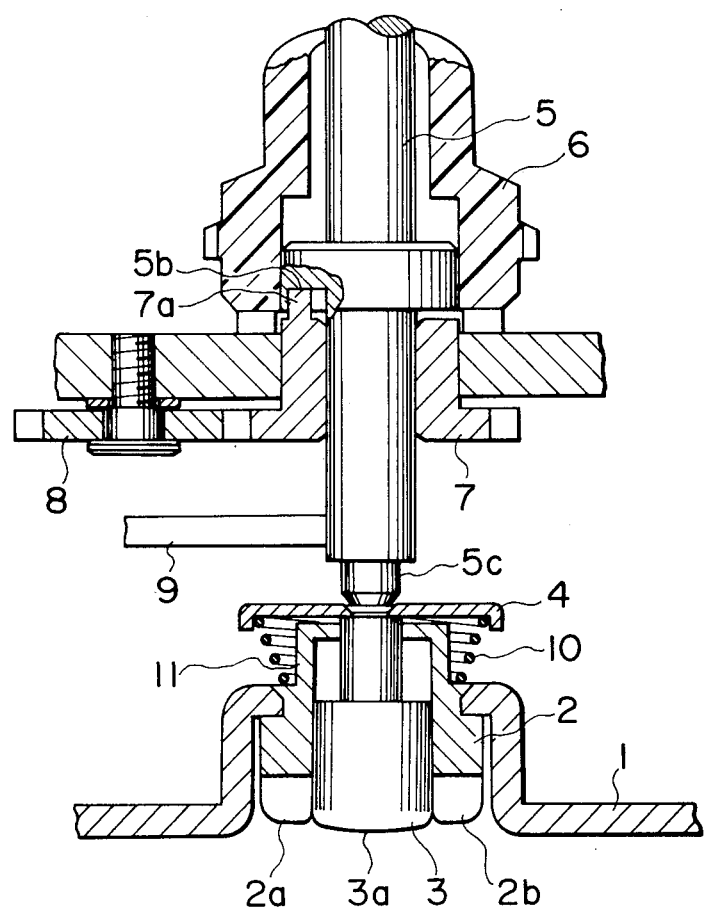
FIG. 2 is a sectional view showing the film rewinding device before operation.
Figure 3:
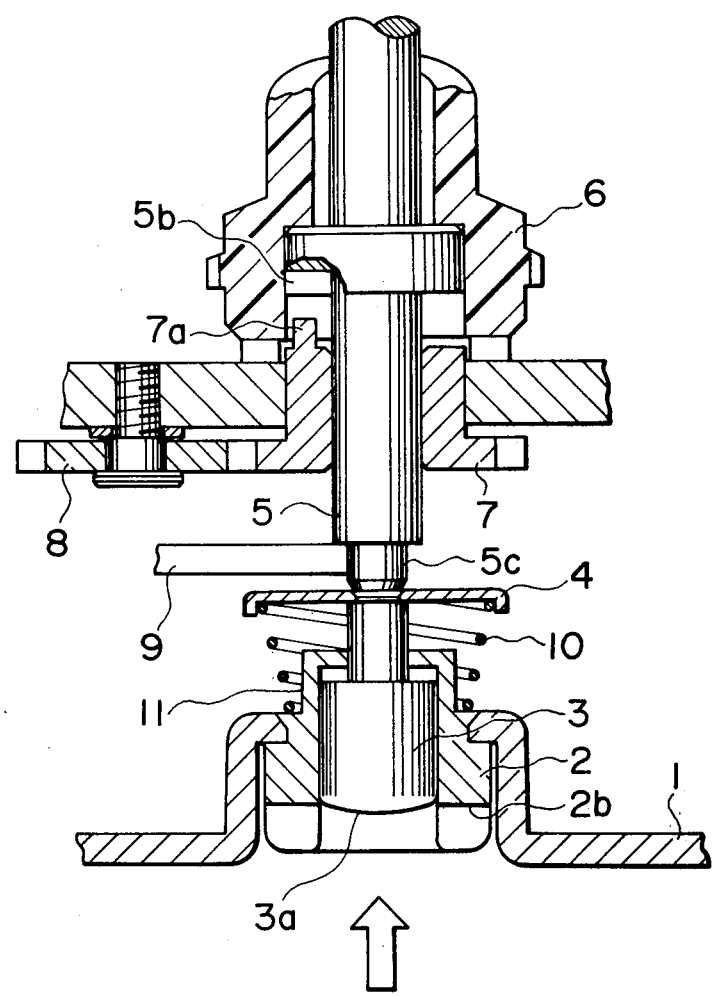
FIG. 3 is a sectional view showing the film rewinding device after operation.

One preferred embodiment of this invention will now be described with reference to the accompanying drawings. Referring to FIGS. 1, 2 and 3, reference number 1 designates an outer housing member of a camera body. A bearing member 2 is fixed in a recess 1a of the housing member 1. A groove 2b is cut in one direction in the upper surface of the bearing member 2. The bearing member is secured to the body 1 and has an inward flange 11 sealing the space between the button 3 and the body. A rewinding button 3 is provided in the bearing member 2 in such a manner that one end portion thereof appears outside the camera body and the other end portion is secured inside the camera body to a spring receiving plate 4 of a spring 10. Hence, as shown in FIGS. 1 and 2, the rewinding button 3 is slidably mounted in the bearing member by being urged or biased into the camera body by means of the spring 10 at all times.

The spring receiving plate 4 abuts against one end surface 5a of a sprocket shaft 5 and is positioned in place by the elastic force of a sprocket spring (not shown). The sprocket shaft 5 is linked to a sprocket 6 for winding film as well known in the art. The sprocket shaft 5 operates in association with a sprocket gear 7 and an idle gear 8 of a conventional rewinding mechanism, (not shown) via clutch mechanism components 5b and 71 (FIG. 1). A locking member 9 is adapted to hold the mechanism in the rewinding state after the film is rewound.

During normal operation of the camera, the upper surface 2a of the bearing member 2 and the end surface 3a of the rewinding button 3 are, in ordinary cases, exposed outside the camera body as shown in FIG. 2. They are, however, maintained in a generally flush arrangement as shown. Therefore, even if the rewinding button 3 is accidentally touched by a finger or bumped erroneously, it is impossible to push the rewinding button 3 inwardly from the upper surface 2a of the bearing member 2.

Figure 4:
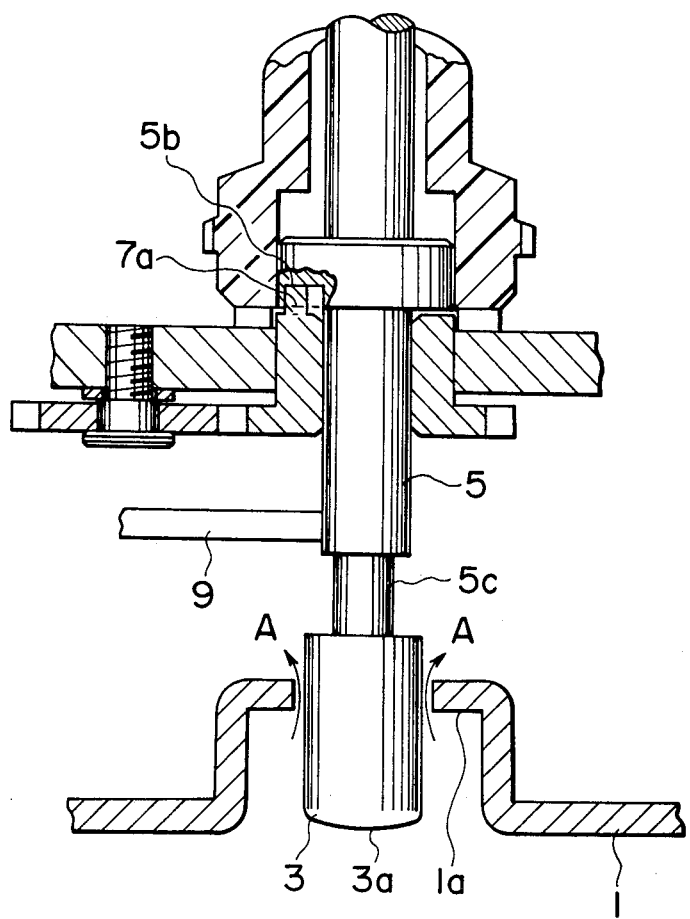
FIG. 4 is a sectional view showing a conventional film rewinding device.
Figure 6:
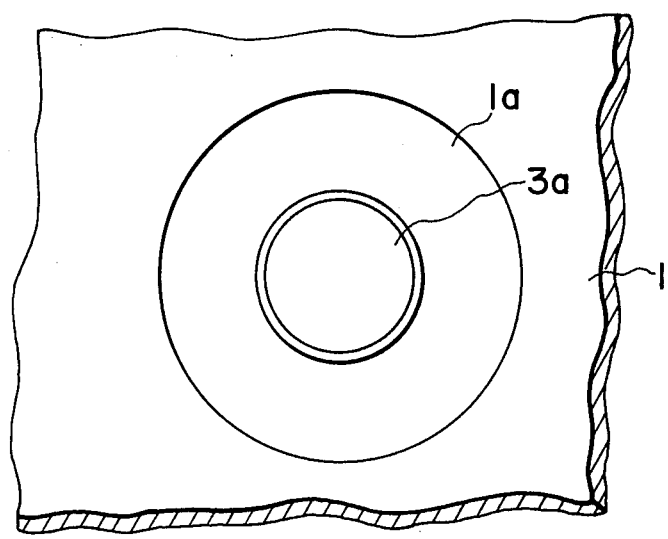
FIG. 6 is an external view showing the conventional film rewinding device.

This should be contrasted with the conventional prior art system. As shown in FIGS. 4 and 6, the rewinding button 3 protrudes in the recess 1a of the housing member 1. Therefore, if the rewinding button 3 is touched by a finger or the like erroneously during handling of the camera, the rewinding button 3 is depressed to the surface of the recess 1a. As a result, the clutch mechanism parts 5b and 7a provided in the winding mechanism (not shown) and the film feeding sprocket 6 are disengaged from each other. Also the locking member 9 engages the annular portion formed by the smaller in diameter section 5c on the sprocket shaft 5 with the aid of a spring (not shown), thereby to prohibit feeding the film. This drawback is a difficult problem in the operation of conventional systems.

However, according to the preferred embodiment of this invention as described herein, it is impossible to depress the rewinding button 3 to the extent that the disengagement of the clutch mechanism occurs. Therefore accidents can be prevented that will erroneously initiate the rewinding operation. As shown, only a deliberate depression of the button from its flush position will cause the system to configure for rewinding.

Figure 5:
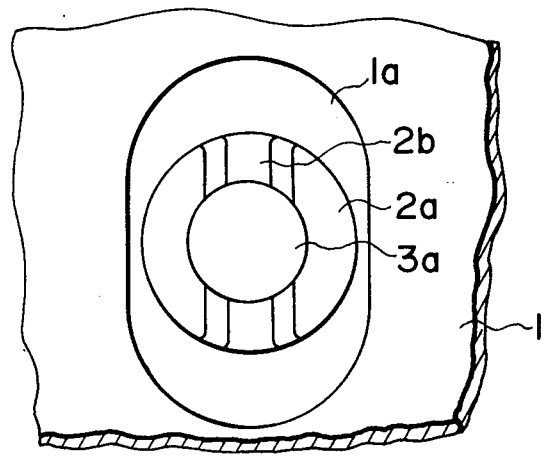
FIG. 5 is an external view showing the film rewinding device according to this invention.

The rewinding operation will be described with reference to FIGS. 3 and 5. The end surface 3a of the rewinding button 3 is depressed in the direction of the arrow (FIG. 3) along the groove 2b of the bearing member 2. As a result the sprocket shaft 5 having its one end 5a abutting against the spring receiving plate 4 is depressed against the elastic force of the sprocket (not shown) which acts against the spring 10. Therefore, the clutch mechanism parts 5b and 71 provided between the winding mechanism and the film winding sprocket 6 are disengaged from each other. As in the conventional system, the disengagement state is held by the locking member 9 as described before, and the film can be rewound.

As is apparent from the above description, according to the present invention, the rewinding mechanism can still have a simple initiation mechanism, yet prevent an erroneous rewinding operation in ordinary camera use and operation. Furthermore, unlike the film rewinding device according to the prior art the film rewinding device according to the invention has no air gap. As shown in FIG. 4 the prior art has a gap A in which dust may enter the camera body. In contrast, in the present system the bearing member eliminates this gap by means of the flange 11 forming a seal between the body 1 and the button 3.

It is apparent that modifications may be made without departing from the essential scope of this invention.

What is claimed is:

1. In a film winding device in a camera having a sprocket shaft carrying a sprocket and a clutch mechanism disengaged from said sprocket by movement of said sprocket shaft and a locking member engaging said sprocket shaft to maintain the sprocket in a state for rewinding, the improvement comprising:
    a camera body having a recess formed therein, a depressable button disposed in said recess, said button operably coupled to said sprocket shaft, a bearing member positioned in said recess around said button and fixed to said camera body; wherein depression of said button in said bearing causes said sprocket shaft to be moved and disengage said clutch mechanism and permit the film to be rewound;
    means biasing said button to a position such that its outer surface is substantially flush with the outer surface of said bearing member;
    a groove in said bearing member, and wherein said button is depressed to the depth of said groove; and
    a locking member, said sprocket shaft having a section of reduced diameter to form an annular engagement surface whereby upon depression of said button said sprocket shaft is depressed and said locking member engages said annular surface to thereby maintain said clutch member in a disengaged position from said sprocket.

2. The system of claim 1 wherein said bearing member further includes flange means forming a seal between said camera body and said button.

3. In a film winding device in a camera having a sprocket shaft carrying a sprocket and a clutch mechanism disengaged from said sprocket by movement of said sprocket and a locking member engaging said sprocket shaft to maintain the sprocket in a state for rewinding, the improvement comprising;
    a camera body having a recess formed therein, a depressable button disposed in said recess, said button operably coupled to said sprocket shaft, a bearing member positioned in said recess around said button and fixed to said camera body; wherein depression of said button in said bearing causes said sprocket shaft to be moved and disengage said clutch mechanism and permit the film to be rewound;
    means biasing said button to a position such that its outer surface is substantially flush with the outer surface of said bearing member; and wherein
    said biasing means biases said button in a direction inwardly relative to said camera body and said recess.

4. The system of claim 3 further comprising a groove in said bearing member and said button is depressed to the depth of said groove.

5. The system of claims 3 or 4 further comprising a receiving member in contact with said sprocket shaft, said biasing means comprising a spring disposed between said receiving member and said bearing member.

* * * * *